United States Patent
Zheng et al.

(10) Patent No.: US 11,345,642 B2
(45) Date of Patent: May 31, 2022

(54) METHOD FOR PREPARING ALUMINA-BASED SOLID SOLUTION CERAMIC POWDER BY USING ALUMINUM OXYGEN COMBUSTION SYNTHESIS WATER MIST PROCESS

(71) Applicant: HARBIN JEHOT ADVANCED MATERIALS CO., LTD., Harbin (CN)

(72) Inventors: Yongting Zheng, Harbin (CN); Yongdong Yu, Harbin (CN); Jinsong Jiang, Harbin (CN); Xiaoyue Su, Harbin (CN); Fengyu Lin, Harbin (CN)

( * ) Notice: Subject to any disclaimer, the term of this patent is extended or adjusted under 35 U.S.C. 154(b) by 5 days.

(21) Appl. No.: 17/259,313

(22) PCT Filed: Aug. 14, 2018

(86) PCT No.: PCT/CN2018/100463
§ 371 (c)(1),
(2) Date: Jan. 11, 2021

(87) PCT Pub. No.: WO2020/010666
PCT Pub. Date: Jan. 16, 2020

(65) Prior Publication Data
US 2021/0253484 A1    Aug. 19, 2021

(30) Foreign Application Priority Data
Jul. 10, 2018    (CN) .......................... 201810755347.5

(51) Int. Cl.
*C04B 35/626*    (2006.01)
*C04B 35/109*    (2006.01)

(52) U.S. Cl.
CPC ........ *C04B 35/6268* (2013.01); *C04B 35/109* (2013.01); *C04B 2235/3225* (2013.01);
(Continued)

(58) Field of Classification Search
CPC .............. C04B 35/6268; C04B 35/109; C04B 2235/3225; C04B 2235/3229; C04B 2235/3232; C04B 2235/3262
See application file for complete search history.

(56) References Cited

FOREIGN PATENT DOCUMENTS

| CN | 103274680 A | 9/2013 |
|---|---|---|
| CN | 103288436 A | 9/2013 |

(Continued)

OTHER PUBLICATIONS

CN206219228 machine translation (Year: 2017).*

*Primary Examiner* — Karl E Group
*Assistant Examiner* — Cameron K Miller
(74) *Attorney, Agent, or Firm* — Novoclaims Patent Services LLC; Mei Lin Wong

(57) ABSTRACT

Disclosed is a method for preparing an alumina-based solid solution ceramic powder by using an aluminum oxygen combustion synthesis water mist process, which comprises: drying raw materials and then mixing same until uniform to obtain a mixed material; loading the mixed material into a high-pressure reactor, igniting same in an oxygen-containing atmosphere, carrying out a high-temperature combustion synthesis reaction to form a high-temperature melt and then carrying out heat preservation for 1-60 s; and then opening a nozzle, ejecting the high-temperature melt through the nozzle and rapidly cooling same through a liquid phase, thus obtaining the alumina-based solid solution ceramic powder.

5 Claims, 2 Drawing Sheets

(52) U.S. Cl.
    CPC ............... *C04B 2235/3229* (2013.01); *C04B 2235/3232* (2013.01); *C04B 2235/3262* (2013.01)

(56) References Cited

FOREIGN PATENT DOCUMENTS

| CN | 103304222 | A | 9/2013 |
|----|-----------|---|--------|
| CN | 104193311 | A | 12/2014 |
| CN | 105986161 | A | 10/2016 |
| CN | 106629799 | A | 5/2017 |
| CN | 206219228 | * | 6/2017 |

* cited by examiner

METHOD FOR PREPARING ALUMINA-BASED SOLID SOLUTION CERAMIC POWDER BY USING ALUMINUM OXYGEN COMBUSTION SYNTHESIS WATER MIST PROCESS

FIELD OF INVENTION

The present invention relates to a method of preparing $Al_2O_3$-based composite solid solution ceramic powder.

DESCRIPTION OF RELATED ARTS

Alumina ceramic has excellent characteristics such as low price, high hardness, high temperature resistance, oxidation resistance, corrosion resistance, high electrical insulation and low dielectric loss. However, the low toughness and brittle fracture of oxide ceramics severely restrict the further application of alumina ceramics. At present, the most common method for toughening oxide ceramics is to dope the nano-second phases in the ceramic matrix to prepare the nano composite ceramic. Through composite toughening and nano toughening, the toughness of the ceramic can be effectively improved. For example, the $ZrO_2$ ceramic has excellent phase transition toughening effect, and at the same time $Al_2O_3$ and $ZrO_2$ have good chemical and physical compatibility, using nanotechnology to prepare zirconia toughened alumina ceramics ($ZrO_2$ Toughening $Al_2O_3$, ZTA) can superimpose phase change toughening and nanoparticle toughening, which greatly improves the mechanical properties of aluminum oxide. On the other hand, due to the formation of nano-scale materials, the proportion of grain boundaries in the material is large, so composite ceramics exhibit special properties and can be applied to functional ceramics. However, the existing technology is still unable to prepare large-scale nanocomposite ceramics in the true sense. Therefore, the present invention discloses a novel composite ceramic powder preparation technology, followed by high-temperature densification process to prepare alumina-based nanocomposite ceramics. At present, the industrial methods for preparing alumina composite solid solution powder mainly include:

(1) Co-Precipitation Method

The co-precipitation method is to add a precipitation agent to a soluble salt solution containing one or more ions (or hydrolyze the solution at a certain temperature) to form insoluble hydroxides, hydrated oxides or salts, which is precipitate from the solution, and obtaining the required nanoparticles by washing the anion contained in the solvent and the solution and carrying out thermal decomposition or dehydration. The most key technology of the precipitation method is to control the formation of the precipitate, which is implemented by adjusting the concentration of the solution and the precipitation agent, the precipitation rate, the reaction temperature, the value of the solution, and additives and the like. In order to obtain powder with uniform particle size distribution, the nucleation process and the growth process are separated, and the agglomeration of the particles is inhibited. The co-precipitation method is relatively simple in preparation process, easy to prepare a sample with high purity and narrow particle size distribution, low production cost, convenient for large-scale industrial production, and is widely used in industry. However, the oxide solid solution prepared by the coprecipitation method is difficult to achieve uniform precipitation, and the prepared sample may undergo phase separation, which will affect its performance, and there are many experimental procedures and poor repeatability.

(2) Hydrothermal Method

The hydrothermal method generally refers to a method of taking a fluid such as aqueous solution or steam as a medium, placing the reaction solution in a reactor lined with polytetrafluoroethylene, and then placing the reactor under a certain temperature condition so that the solution react under a high-temperature and high-pressure condition in the reactor. Since the viscosity and surface tension of water decrease with the increasing temperature, the mobility of molecules and ions in the solution is greatly enhanced under high temperature and high pressure, and there is a very effective diffusion in the aqueous solution. The hydrothermal method can be divided into two types according to the principle: one is to increase the particle size by hydrothermal method, such as hydrothermal crystallization; the other is to reduce the particle size, such as hydrothermal oxidation. In the hydrothermal reaction, water can not only participate in the reaction, but also act as a solvent and expansion promoter, as well as a pressure transmission medium. By accelerating the reaction and controlling the physicochemical factors of the hydrothermal process, the formation of compounds and the improvement of compound properties are realized.

The material prepared by the hydrothermal method has high purity, uniform crystal morphology, small crystal grain size, good dispersion, and no subsequent processes such as heat treatment. However, the equipment requires high temperature and high pressure steel, and corrosion-resistant lining, the technical difficulty is high, temperature and pressure control requirement is strict, and the cost is high. Also, the safety is poor, the volume expansion of the fluid in the closed reactor during heating can generate an extremely great pressure and impose a great potential safety hazards. It is still not suitable for mass production at present.

(3) Sol-Gel Method

The sol-gel method refers to the entire process of dissolving a liquid-phase precursor metal alkoxide (or an inorganic salt compound) and a solvent, carrying out a hydrolysis reaction (reaction of non-ionizing molecular precursor and water) and a polycondensation reaction (dehydration condensation or dealcoholysis condensation), then allowing standing and gel, and finally performing heat treatment to finally form the solid. Monodispersed oxide particles are grown by dissolving-recrystallization thereof. Since the raw materials used in the sol-gel method are first dispersed into the solvent to form a solution with low viscosity, the uniformity at molecular level can be obtained in a very short time, and when the gel is forming, it is likely that the reactants are uniformly mixed at the molecular level. Meanwhile, a solution reaction step is carried out, some trace elements can be uniformly and quantitatively incorporated into the solution, and uniform doping on the molecular level is realized. Compared with the solid phase reaction, the chemical reaction is easier to conduct, and only requires a lower synthesis temperature. However, the raw materials used in the sol-gel method are relatively expensive. Some raw materials are organic, which is harmful to health and easy to pollute the environment. At the same time, the entire sol-gel process takes a long time, usually several days or weeks. In addition, there are a large number of micropores in the gel, and a lot of gas and organic matter will escape during the drying process and shrinkage will affect the final performance of the product.

In conclusion, the initial particle size of the nano powder prepared by the coprecipitation method is small, the particle size distribution range is narrow, and the morphology of the powder can be adjusted by controlling the pH value and the temperature of the solution; the shortcoming is that the hybridization of chloride ions introduced in the process is difficult to completely remove, so that the product performance is influenced. Meanwhile, chemical pollution can be generated in the preparation process; the process requirement is strict and the cost is high; and the structural defect of the product can be caused in the calcination process. Although the hydrothermal method can prepare the powder with better performance, and the shortcomings caused by calcination can be eliminated, the equipment requirement is high, and the manufacturing cost is high. The sol-gel method has a long production cycle and is easy to cause pollution during the production process. At the same time, the use of nano-powders to prepare high-performance nano-ceramics needs to overcome a series of technical problems: 1) The mainstream production process of nano ceramic powder is a liquid phase method, which has certain chemical pollution; 2) The surface activity of the nano powder is large, and the nano powder is easy to agglomerate, which makes the powder dispersion in the subsequent mixing and molding processes poor, thus the existing technological method and process need to be changed and the manufacturing cost is increased; meanwhile the introduced chemical substances are dispersed, and a certain degree of pollution will occur in the subsequent degreasing process; 3) The sintering activity of nano-powders is very large, and the abnormal growth of nano-crystalline grains needs to be controlled during the sintering process.

SUMMARY OF THE PRESENT INVENTION

Technical Problems

An object of the present invention is to solve the problems of complex process, high cost, and low output in the prior art, and to provide a method for preparing alumina-based solid solution ceramic powder by the aluminum-oxygen combustion synthesis and water spraying process.

Solution to the Technical Problems

Technical Solution

A method for preparing alumina-based solid solution ceramic powder by the aluminum-oxygen combustion synthesis and water spraying process is specifically carried out according to the following steps:

Drying raw materials and then mixing uniformly to obtain a mixture; loading the mixture into a high-pressure reactor, starting ignition in an oxygen-containing atmosphere, and carrying out high-temperature combustion synthesis reaction; keeping warm for 1 s-60 s after a high-temperature melt is formed; then turning on a nozzle, spraying out the high-temperature melt through the nozzle to carry out liquid phase rapid cooling so that an alumina-based solid solution ceramic powder is obtained, the raw materials are aluminum powder and diluent, and the mass fraction of the aluminum powder in the mixture is 10%-40%, and the mass fraction of the diluent is 60%-90%.

Advantageous Effect of the Present Invention

Advantageous Effect

The advantageous effect of the present invention:
1. The alumina-based solid solution ceramic powder obtained by the method of the present invention has a relatively better microstructure and uniform particles. According to the present invention, the requirement on the particle size of the raw materials is not high, so powder at the micron-scale can be used and the cost is greatly reduced.
2. The alumina-based solid solution ceramic powder obtained by the method of the present invention has a diameter of 0.5 μm-30 μm. Through a high-temperature densification process, the composite solid solution powder can be subjected to solid solution precipitation to form a nano-phase, so that an uniform and fine nano-precipitation structure is obtained. At present, aluminum oxide-based nanocomposite ceramic can be obtained by hot-pressing and sintering with this method, when the zirconium oxide content is lower (20 wt %-40 wt %), the strength can reach 1000 MPa, and the toughness can reach 12 MPa·m$^{1/2}$; when the zirconium oxide content is moderate (40 wt %-60 wt %), the strength can reach 1100 MPa, and the toughness can reach 13 MPa·m$^{1/2}$; when the zirconium oxide content is higher (60 wt %-80 wt %), the strength can reach 1200 MPa, and the toughness can reach 15 MPa·m$^{1/2}$.
3. The present invention belongs to a fast technological process with extremely high efficiency. The required heat preservation time is 1-60 seconds, 1 kg-30 kg of the powder can be sprayed at one time, and the preparation efficiency of the powder is high.

BRIEF DESCRIPTION OF THE DRAWINGS

Description of the Drawings

Figure 1:
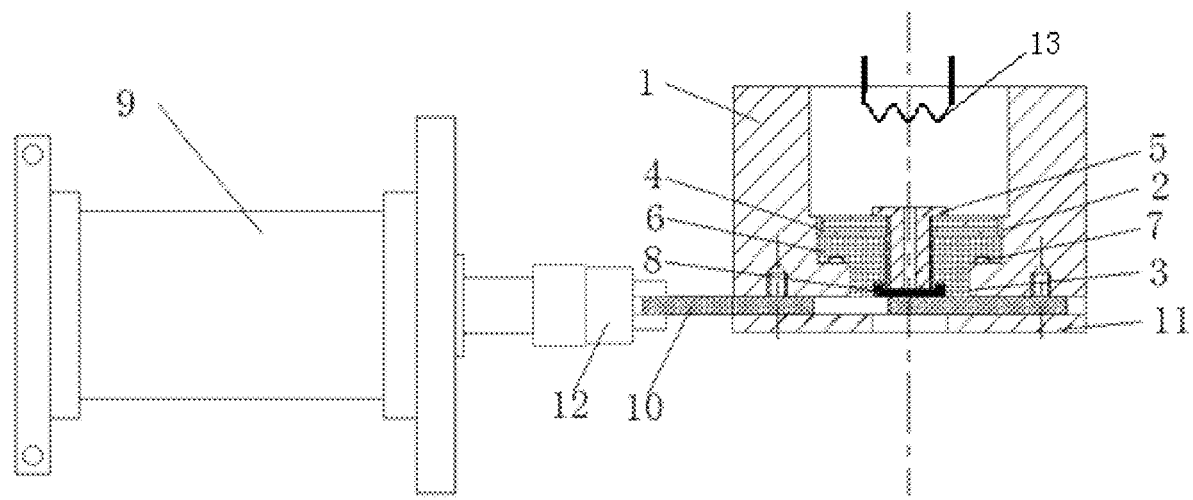
Figure 2:
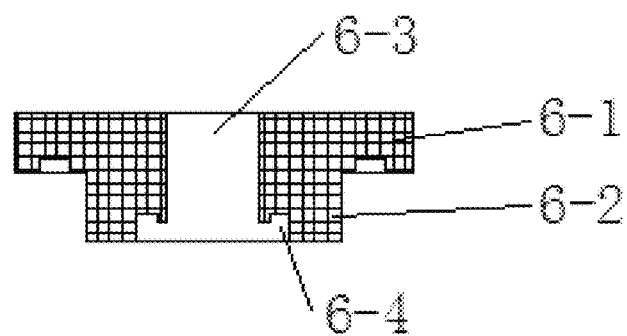
Figure 3:
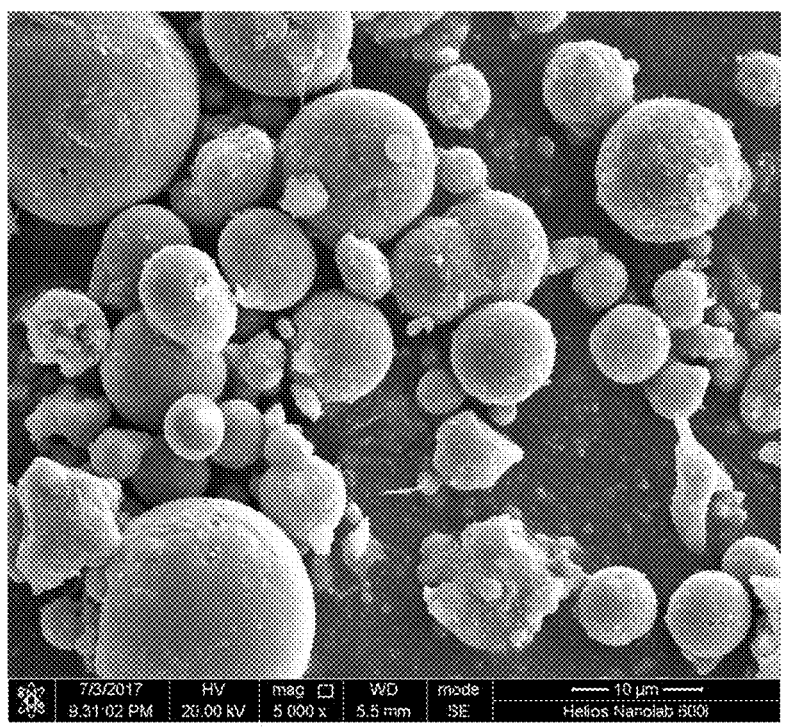
Figure 4:
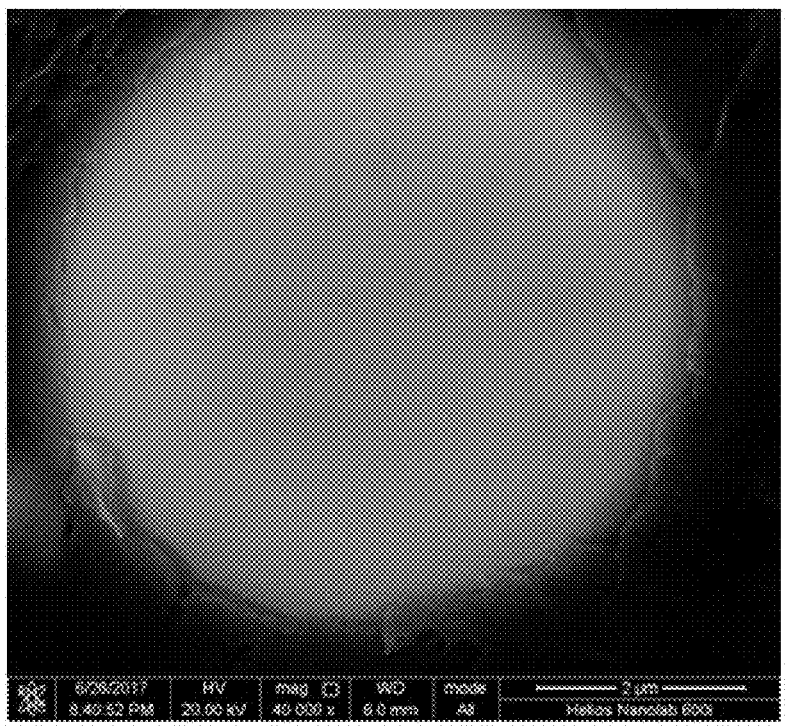

FIG. 1 is a schematic structural diagram of a high-pressure reactor used in the method of the present invention;

FIG. 2 is a schematic structural diagram of a nozzle support in the high-pressure reactor;

FIG. 3 is the morphology of alumina-based solid solution ceramic powder prepared in Exemplary Embodiment 1;

FIG. 4 is the cross-section tissue morphology of aluminum oxide-based solid solution ceramic obtained in Exemplary Embodiment 1.

EMBODIMENT OF THE PRESENT INVENTION

Detailed Description of the Preferred Embodiment of the Present Invention

Embodiment 1

According to this embodiment, a method for preparing alumina-based solid solution ceramic powder by an aluminum-oxygen combustion synthesis and water spraying process is specifically carried out according to the following steps:

Drying raw materials and then mixing uniformly to obtain a mixture; loading the mixture into a high-pressure reactor, starting ignition in an oxygen-containing atmosphere, and carrying out high-temperature combustion synthesis reaction; keeping warm for 1 s-60 s after a high-temperature melt is formed; then turning on a nozzle, spraying out the high-temperature melt through the nozzle to carry out liquid phase rapid cooling so that an alumina-based solid solution ceramic powder is obtained, the raw materials are aluminum powder and diluent, and the mass fraction of the aluminum powder in the mixture is 10%-40%, and the mass fraction of the diluent is 60%-90%.

This embodiment is described with reference to FIG. 1 and FIG. 2. The high-pressure reactor comprises a reactor 1, a pressure plate 4, a nozzle 5, a nozzle support 6, a pre-tightening sealing member 8, an upper sliding plate 10, a lower sliding plate 11, a resistance wire 13 and a drag device 9. There are two stepped circular holes along the thickness direction of the bottom of the reactor 1, the first stepped circular hole 2 is located on the upper part of the second stepped circular hole 3 and the diameter of the first stepped circular hole 2 is larger than the diameter of the second stepped circular hole 3.

The nozzle support 6 comprises a coaxial integral structure formed by a circular plate-shaped frame body portion 6-1 and a cylindrical portion 6-2, an insertion hole 6-3 opened along a central axis of the nozzle support 6, an annular groove 6-4 opened on an end surface of the cylindrical portion 6-2, and the nozzle support 6 is inserted into the two leveled stepped circular holes, the cylindrical portion 6-2 is matched with the second stepped circular hole 3, the circular plate-shaped frame body portion 6-1 is matched with the first stepped circular hole 2, the lower surface of the circular plate-shaped frame body portion 6-1 overlaps the step surface of the two leveled stepped circular holes, and a pre-tightening sealing member 8 is embedded into the circular ring groove 6-4.

The pressing plate 4 is arranged on the upper surface of the circular plate-shaped frame body portion 6-1, the pressing plate 4 is in threaded connection with the first stepped circular hole 2, and a pressing plate through hole is formed in the center of the pressing plate 4.

The nozzle 5 is provided in the pressure plate through hole of the pressing plate 4 and the insertion hole 14 of the nozzle support 6, a graphite core is arranged in the nozzle 5, a bottom surface of the nozzle 5 abuts against the upper surface of the pre-tightening sealing member 8, the upper plate surface of the upper sliding plate 10 is in contact with the outer surface of the bottom of the reactor 1, and a lower sliding plate 11 is arranged below the upper sliding plate 10 in contact with each other. The upper sliding plate 10 and the lower sliding plate 11 are provided with sliding plate through holes respectively. The diameter of the sliding plate through holes ensures the passage of the pre-tightening sealing member 8. The sliding plate through hole on the lower sliding plate 11 faces the pre-tightening sealing member 8, and the upper sliding plate 10 is driven by the drag device 9 to move horizontally. The nozzle 5 has a nozzle size of Φ1-20 mm.

According to this embodiment, an aluminum oxygen combustion synthesis and water spraying process is adopted. The method does not require an external heat source, and uses active metal aluminum and oxygen as reactants to generate an aluminum-oxygen combustion synthesis reaction to synthesize inorganic refractory materials. In this embodiment, the ignited mixture material in the high-pressure reactor undergoes an exothermic reaction, resulting in high temperature and high pressure conditions, so that the mixture material reaches above the melting point to form a high-temperature melt. The high-temperature melt is sprayed into the liquid cooling medium under high-temperature and high-pressure conditions, and atomized and rapidly cooled to form a composite oxide solid solution powder. This embodiment controls the theoretical adiabatic temperature and reaction pressure of the combustion synthesis reaction by designing the ratio of the aluminum powder to the diluent in the mixture; at different reaction temperatures, reaction pressures and different controlled atomization solutions (such as water, various salt solutions of water, etc.), different cooling rates can be obtained. The composite solid solution powder can undergo solid solution precipitation through the high-temperature densification process to form nano-phases. The nano-phases are dispersed and evenly distributed in the matrix to obtain a high-density, dense and uniform nano-precipitation structure, and high-strength and tough nano-composite oxide ceramics are obtained. This method of preparing nano-composite oxide ceramics in situ through solid phase change solves the problems of uneven distribution of nanoparticles in the matrix, easy agglomeration and grain growth in traditional processes. The process of this method is simple, the reaction is rapid, the preparation period is short, and the output is large. It is a new low-cost, green and environmentally friendly, high-efficiency process method for preparing nano composite oxide ceramics.

The principle of this embodiment: According to the method of this embodiment, the active metal aluminum is used as the reducing agent, and oxygen is used as the oxidizing agent to provide a heat source for the exothermic reaction. Oxygen with a specific pressure is introduced to regulate the reaction temperature and the reaction pressure, and meanwhile oxygen-containing mixed gas (such as $O_2$, $N_2$ and air) can be introduced to adjusting the reaction pressure and the reaction product. One or more diluents (which do not react with the reactant, oxides are the major compound) is added to control the reaction temperature and the product component to obtaining the oxide composite solid solution ceramic powder of different systems. The method of this embodiment has the advantages that the cost is low, large-batch production can be carried out, and meanwhile, due to the fact that the formed solid solution powder is rapidly cooled in a high-temperature environment, a large amount of vacancies exist in the solid solution, which is very beneficial for the subsequent sintering processes.

According to this embodiment, the temperature generated in the combustion synthesis process can reach 2100-4000° C. When the mass fraction of the aluminum powder in the mixture material is 10%, the oxygen content is 5 MPa, the mass ratio of the reactant (aluminum powder) to the raw material is the lowest, then at this point, the adiabatic temperature of combustion synthesis of the system is the lowest, which is 2100° C.; when the mass fraction of the aluminum powder in the mixture material is 40% and the mass ratio of the reactant (aluminum powder) to the raw material is the highest, then at this point, the adiabatic temperature of combustion synthesis of the system is the highest, which is 4000° C.

According to the embodiment, the reaction pressure in the combustion synthesis process is mainly adjusted by three ways: 1. the gas pressure in the reaction vessel after the reaction is adjusted by changing the raw material proportion and the atmosphere pressure; 2. the pressure is adjusted through the temperature generated by the reaction; 3. after the reaction, the system is reduced to a specified pressure by reducing pressure. Finally, the pressure range in the system is controlled at 0.5 MPa-50 MPa, that is, the high temperature melt is sprayed out from the nozzle under the air pressure of 0.5 MPa-50 MPa.

When the composite oxide melt is sprayed from the nozzle at high speed under high temperature and high pressure, it is sprayed into the liquid cooling medium (water, salt solution, etc.) to be atomized and rapidly cooled to form a composite solid solution powder. When the composite oxide melt is in a low-temperature and high-pressure state when it is sprayed, because the solution on the surface of the droplet cools extremely fast, amorphous powder will form on the surface of the solid solution powder. In the equilibrium state, the solid solubility of the oxide is very small, generally less than 10 wt %, and the solid solution powder prepared by this embodiment greatly improves the solid solubility. For example, in the prepared solid solution powder of $Al_2O_3/ZrO_2$ system, the content of $ZrO_2$ ranges from 0 wt % to 85 wt %. At the same time, this embodiment adopts a fast process with extremely high efficiency. The time to form a high-temperature melt during the high-temperature combustion synthesis reaction is only a few seconds to a few minutes, the required heat preservation time is 1-60 seconds, 1-30 kg of powder can be sprayed at one time, and the powder preparation efficiency is very high.

When the alumina-based solid solution ceramic powder is $Al_2O_3/ZrO_2$ system solid solution ceramic powder, the $ZrO_2$ content in the $Al_2O_3/ZrO_2$ system solid solution ceramic powder can reach 0-85 wt %. When the raw material powder is Al powder and the diluent is all aluminum oxide, the $ZrO_2$ content in the prepared $Al_2O_3/ZrO_2$ system solid solution ceramic powder is 0 wt %. When the raw material powder is Al powder and the diluent is all zirconium oxide, and the adiabatic temperature is set at 2100° C. (such that the required reaction heat is minimized, the amount of Al powder is reduced and the generation of $Al_2O_3$ is reduced), the $ZrO_2$ content in the prepared $Al_2O_3/ZrO_2$ system solid solution ceramic powder can reach 85 wt %. In addition, the $ZrO_2$ content in the prepared $Al_2O_3/ZrO_2$ system solid solution ceramic powder can be further increased by preheating. In addition to preparing $Al_2O_3/ZrO_2$ system solid solution ceramic powder, various $Al_2O_3$-based composite solid solution powder (such as $Al_2O_3/MgO$, $Al_2O_3/TiO_2$, $Al_2O_3/SrO$ and the like) can also be prepared. The preparation method is similar to the above, but the initial raw materials added are different.

When zirconium oxide is contained in the aluminum oxide-based solid solution, ceramic powder, yttrium oxide, cerium oxide, magnesium oxide, calcium oxide, titanium oxide or scandium oxide is added to act as a phase change stabilizer. For example, yttrium oxide is added as a phase change stabilizer, and $Al_2O_3/ZrO_2(Y_2O_3)$ solid solution powder can be prepared.

When only $O_2$ gas is introduced, the reaction formula of aluminum-oxygen combustion synthesis is:

$$4Al+3O_2 \rightarrow 2Al_2O_3$$

In the process of aluminum-oxygen combustion synthesis reaction, the reaction temperature is extremely high, which can reach 2000-5000° C. Adding one or more diluents can not only improve the stability of aluminum-oxygen combustion synthesis, but also help control the proportion of final products, so as to obtain solid solution powder in different proportions.

When $O_2/N_2$ mixed gas or air is introduced, the reaction formula of aluminum-oxygen combustion synthesis is (by taking the final product of $Al_2O_3/ZrO_2$ as an example):

$$4Al+3O_2 \rightarrow 2Al_2O_3$$

$$8Al+3N_2+6ZrO_2 \rightarrow 4Al_2O_3+6ZrN$$

When $O_2/N_2$ mixed gas or air is introduced, Al preferentially reacts with oxygen. The ZrN phase produced in the powder product is used as a hard phase, so that the mechanical property and the electronic conductivity of the material are improved.

In order to reduce $Al_2O_3/ZrO_2$ generated by reaction, the ratio of $Al_2O_3/ZrO_2$ in the final product is regulated. The raw materials can be preheated (the preheating temperature is 25-300° C.), and preheating the raw materials at the same set temperature can reduce the required heat of reaction. From the reaction equation, it can be seen that the reaction can generate $Al_2O_3$, preheating can improve the content of $ZrO_2$, and the composite solid solution powder with high $ZrO_2$ content is prepared.

Embodiment 2

The difference between this embodiment and the embodiment 1 is that: the diluent is one or more of the group consisting of: aluminum oxide, zirconium oxide, magnesium oxide, calcium oxide, strontium oxide, scandium (III) oxide, iron oxide, molybdenum oxide, barium oxide, vanadium oxide, titanium oxide, chromium oxide, cobalt oxide, nickel oxide, yttrium oxide, niobium oxide, hafnium (IV) oxide, tantalum oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, silicon oxide and lutetium oxide. Others are the same as the embodiment 1.

When the alumina-based solid solution ceramic powder is $Al_2O_3/ZrO_2$ system solid solution ceramic powder, the $ZrO_2$ content in the $Al_2O_3/ZrO_2$ system solid solution ceramic powder can reach 0-85 wt %. When the raw material powder is Al powder and the diluent is all aluminum oxide, the $ZrO_2$ content in the prepared $Al_2O_3/ZrO_2$ system solid solution ceramic powder is 0 wt %. When the raw material powder is Al powder and the diluent is all zirconium oxide, and the adiabatic temperature is set at 2100° C. (such that the required reaction heat is minimized, the amount of Al powder is reduced and the generation of $Al_2O_3$ is reduced), the $ZrO_2$ content in the prepared $Al_2O_3/ZrO_2$ system solid solution ceramic powder can reach 85 wt %. In addition, the $ZrO_2$ content in the prepared $Al_2O_3/ZrO_2$ system solid solution ceramic powder can be further increased by preheating.

According to this embodiment, in addition to preparing $Al_2O_3/ZrO_2$ system solid solution ceramic powder, various $Al_2O_3$-based composite solid solution powder (such as $Al_2O_3/MgO$, $Al_2O_3/TiO_2$, $Al_2O_3/SrO$ and the like) can also be prepared. The preparation method is similar to the above, but the initial raw materials added are different.

Embodiment 3

The difference between this embodiment and the embodiment 2 is that: when the product of aluminum-oxygen combustion synthesis contains zirconium oxide, a molar ratio of yttrium oxide to zirconium oxide is (0-20):100; a molar ratio of cerium oxide to zirconium oxide is (0-30):100; a molar ratio of magnesium oxide to zirconium oxide is (0-28):100; a molar ratio of calcium oxide to zirconium oxide is (0-33.45):100; a molar ratio of titanium oxide to zirconium oxide is (0-44.41):100; a molar ratio of scandium oxide to zirconium oxide is (0-20):100. Others are the same as the embodiment 2.

In this embodiment, yttrium oxide, cerium oxide, magnesium oxide, calcium oxide, titanium oxide or scandium oxide is added to act as a phase change stabilizer, and corresponding phase change stabilizers are added to prepare composite oxide solid solution powders of different systems. For example, yttrium oxide can be added to the $Al_2O_3/ZrO_2$ system as a phase change stabilizer to prepare $Al_2O_3/ZrO_2(Y_2O_3)$ solid solution powder.

Embodiment 4

The difference between this embodiment and one of the embodiments 1-3 is that: the oxygen-containing atmosphere is an atmosphere of oxygen, oxygen and air mixture, or a mixture of oxygen and nitrogen.

When the oxygen-containing atmosphere is the atmosphere of oxygen, a pressure of oxygen is 5 MPa-50 Mpa; when the oxygen-containing atmosphere is the atmosphere of oxygen and air mixture, a pressure of oxygen in the oxygen-containing atmosphere is 5 MPa-50 Mpa, a pressure of air is 0 MPa-20 MPa;

when the oxygen-containing atmosphere is the atmosphere of oxygen and nitrogen mixture, a pressure of oxygen in the oxygen-containing atmosphere is 5 MPa-50 Mpa, a pressure of nitrogen is 0 MPa-20 MPa.

Others are the same as the embodiments 1-3.

When only $O_2$ gas is introduced, the reaction formula of aluminum-oxygen combustion synthesis is:

$$4Al+3O_2 \rightarrow 2Al_2O_3$$

In the process of aluminum-oxygen combustion synthesis reaction, the reaction temperature is extremely high, which can reach 2000-5000° C. Adding one or more diluents can not only improve the stability of aluminum-oxygen combustion synthesis, but also help control the proportion of final products, so as to obtain solid solution powder in different proportions.

When $O_2/N_2$ mixed gas or air is introduced, the reaction formula of aluminum-oxygen combustion synthesis is (by taking the final product of $Al_2O_3/ZrO_2$ as an example):

$$4Al+3O_2 \rightarrow 2Al_2O_3$$

$$8Al+3N_2+6ZrO_2 \rightarrow 4Al_2O_3+6ZrN$$

When $O_2/N_2$ mixed gas or air is introduced, Al preferentially reacts with oxygen. The ZrN phase produced in the powder product is used as a hard phase, so that the mechanical property and the electronic conductivity of the material are improved.

Embodiment 5

The difference between this embodiment and the embodiment 4 is that: when the oxygen-containing atmosphere is the atmosphere of oxygen and air mixture, a pressure of oxygen in the oxygen-containing atmosphere is 5 MPa-50 Mpa, a pressure of air is 0.1 MPa-20 MPa;

when the oxygen-containing atmosphere is the atmosphere of oxygen and nitrogen mixture, a pressure of oxygen in the oxygen-containing atmosphere is 5 MPa-50 Mpa, a pressure of nitrogen is 0.1 MPa-20 MPa.

Others are the same as the embodiment 4.

Embodiment 6

The difference between this embodiment and the embodiments 1-5 is that: The mixture is loaded into a high-pressure reactor, and the mixture is first heated to 25-300° C., and then ignited in an oxygen-containing atmosphere to perform high-temperature combustion synthesis reaction. Others are the same as the embodiments 1-5.

The raw materials can be preheated (the preheating temperature is 25-300° C.), and preheating the raw materials at the same set temperature can reduce the required heat of reaction. From the reaction equation, it can be seen that the reaction can generate $Al_2O_3$, preheating can reduce the generation of $Al_2O_3$ and finally control the ratio of $Al_2O_3/ZrO_2$ in the final product. Preheating can improve the content of $ZrO_2$, and the composite solid solution powder with high $ZrO_2$ content is prepared.

Embodiment 7

The difference between this embodiment and the embodiments 1-6 is that: a method for preparing alumina-based solid solution ceramic powder by an aluminum-oxygen combustion synthesis and water spraying process is specifically carried out according to the following steps:

1. Drying: Dry the aluminum powder and diluent. The aluminum powder is dried in vacuum, inert gas or reducing gas. The aluminum oxide diluent is dried directly. The drying temperature is 60-120° C., and the drying time is 8-6 h; the vacuum degree of vacuum drying is 0.05-0.09 MPa.

2. Mixing: Mix the dried aluminum powder with the dried diluent obtained in step 1, and use a planetary ball mill for ball milling. The mass ratio of the balls is 3:1, and the milling time is 2-8 h. After the ball milling, it passes through a 40-200 mesh sieve to obtain the mixture. The mass fraction of aluminum powder in the mixture is 10%-40%, and the mass fraction of diluent is 60%-90%.

3. Loading the mixture into a high-pressure reactor, introducing $O_2$ or $O_2$ mixed gas into the high-pressure reactor, and setting the pressure at 5-50 MPa. The nozzle is arranged at the lower end of the high-pressure reactor. The nozzle size of the nozzle is Φ1-20 mm. The high-pressure reactor is installed in the circulating water-cooling device, the resistance wire ignites the mixture material, and the high-temperature combustion synthesis reaction is carried out. During the reaction, the temperature is set to 2100-4000° C. After the high-temperature melt is formed, keep warm (maintain heat preservation inside the reactor) for 1 s-60 s. Then the nozzle is turned on, and the high-temperature melt is ejected through the nozzle under high temperature and high pressure, and the liquid phase is rapidly cooled to obtain alumina-based solid solution ceramic powder.

The content of the present invention is not limited to the content of the foregoing embodiments, and a combination of one or several specific embodiments can also achieve the purpose of the invention.

Exemplary Embodiment 1

A method for preparing alumina-based $Al_2O_3/ZrO_2$ solid solution ceramic powder by an aluminum-oxygen combustion synthesis and water spraying process is specifically completed by the following steps:

1. Drying: Dry the aluminum powder, alumina powder and zirconia powder. The aluminum powder is vacuum dried at a vacuum of 0.06 MPa, the drying temperature is 80° C., and the drying time is 12 hours; the alumina powder and zirconia powder are directly dried, the drying temperature is 80° C., and the drying time is 12 hours.

2. Mixing: Mixing 131.72 g of dried aluminum powder, 398.49 g of dried alumina powder and 469.78 g of dried zirconia powder. The planetary ball mill is used for ball milling, the mass ratio of ball to material is 3:1, the ball milling time is 4 h, after ball milling, it is passed through a sieve of 40-200 mesh to obtain the mixture material.

3. Loading the mixture material into a high-pressure reactor, introducing $O_2$, and setting the oxygen pressure at 13 MPa. The nozzle is arranged at the lower end of the high-pressure reactor. The nozzle size of the nozzle is Φ8 mm. The high-pressure reactor is installed at an upper side of the circulating water-cooling device, the resistance wire ignites the mixture material, and the high-temperature combustion synthesis reaction is carried out. After the high-temperature melt is formed, keep warm for 10 s. Then the nozzle is turned on, and the high-temperature melt is ejected through the nozzle under high-temperature and high-pressure and is sprayed into the water-cooling device for rapid cooling of the liquid phase to obtain alumina-based solid solution ceramic powder. The cooling liquid for rapid cooling of the liquid phase is water.

BSE analysis was performed on the alumina-based solid solution ceramic powder and oxide composite solid solution ceramic obtained in Exemplary embodiment 1, which is shown in FIG. 3. FIG. 3 illustrates the morphology of the alumina-based solid solution ceramic powder prepared in Exemplary embodiment 1. It can be seen from FIG. 3 that the spherical powder is almost uniform and milky white (black is the solid glue that binds the powder particles). The solid solution powder is obtained because the cooling rate is fast. These results further indicate that the oxide composite melt formed by the aluminum-oxygen combustion synthesis can be cooled in the liquid phase to prepare high-purity spherical micron oxide composite solid solution powder. Also, the cost is low, and it is green and environmentally friendly, and suitable for large-scale industrial production.

The alumina-based solid solution ceramic powder was densified by hot pressing to sintering to obtain alumina-based solid solution ceramics. The cross-sectional structure of the alumina-based solid solution ceramic is shown in FIG. 4, which is the cross-sectional structure of the alumina-based solid solution ceramic obtained in Exemplary embodiment 1. The solid solution oxide ceramic has been tested by a three-point bending test, and its performance is: fracture toughness is 8.45 MPa·m$^{1/2}$ and bending strength is 680 MPa.

Exemplary Embodiment 2

A method for preparing alumina-based $Al_2O_3/ZrO_2$ composite solid solution ceramic powder by an aluminum-oxygen combustion synthesis and water spraying process is specifically carried out by the following steps:

1. Drying: Dry the aluminum powder, alumina powder and zirconia powder. The aluminum powder is vacuum dried at a vacuum of 0.061 MPa, the drying temperature is 80° C., and the drying time is 10 h; the alumina powder and zirconia powder are directly dried, the drying temperature is 80° C., and the drying time is 10 h.

2. Mixing: Mixing 207.8 g of dried aluminum powder, 554.9 g of dried alumina powder and 237.31 g of dried zirconia powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$, and setting the oxygen pressure at 22 MPa. The nozzle is arranged at the lower end of the high-pressure reactor. The nozzle size of the nozzle is Φ2 mm. The high-pressure reactor is installed at an upper side of the circulating water-cooling device, the resistance wire ignites the mixture material, and the high-temperature combustion synthesis reaction is carried out. After the high-temperature melt is formed, keep warm for 40 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 3

A method for preparing alumina-based $Al_2O_3/ZrO_2$ ($CeO_2$) composite solid solution ceramic powder by an aluminum-oxygen combustion synthesis and water spraying process is specifically carried out by the following steps:

1. Drying: Dry the aluminum powder, alumina powder and zirconia powder. The aluminum powder is vacuum dried at a vacuum of 0.061 MPa, the drying temperature is 80° C., and the drying time is 10 h; the alumina powder and zirconia powder are directly dried, the drying temperature is 80° C., and the drying time is 10 h.

2. Mixing: Mixing 114.22 g of dried aluminum powder, 4.54 g of dried alumina powder, 98.62 g of dried cerium oxide and 881.232 g of dried zirconia powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$, and setting the oxygen pressure at 12 MPa. The nozzle is arranged at the lower end of the high-pressure reactor. The nozzle size of the nozzle is Φ6 mm. The high-pressure reactor is installed at an upper side of the circulating water-cooling device, the resistance wire ignites the mixture material, and the high-temperature combustion synthesis reaction is carried out. After the high-temperature melt is formed, keep warm for 10 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

The amorphous and solid solution micron powders are densified by hot pressing and sintering, and the prepared material is subjected to a three-point bending test. Its performance is: fracture toughness is 13.25 MPa·m$^{1/2}$ and bending strength is 995 MPa.

Exemplary Embodiment 4

A method for preparing alumina-based $Al_2O_3/ZrO_2$ ($Y_2O_3$) composite solid solution ceramic powder by an aluminum-oxygen combustion synthesis and water spraying process is specifically carried out by the following steps:

1. Drying: Dry the aluminum powder, alumina powder, zirconia powder and yttrium oxide powder. The aluminum powder is vacuum dried at a vacuum of 0.06 MPa, the drying temperature is 80° C., and the drying time is 10 h; the alumina powder, the zirconia powder, and the yttrium oxide powder are directly dried, the drying temperature is 80° C., and the drying time is 10 h.

2. Mixing: Mixing 154.76 g of dried aluminum powder, 367.14 g of dried alumina powder, 478.10 g of dried zirconia powder and 175.79 g of dried yttrium oxide. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$, and setting the oxygen pressure at 15 MPa. The nozzle is arranged at the lower end of the high-pressure reactor. The nozzle size of the nozzle is 16 mm. The high-pressure reactor is installed at an upper side of the circulating water-cooling device, the resistance wire ignites the mixture material, and the high-temperature combustion synthesis reaction is carried out. After the high-temperature melt is formed, keep warm for 20 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 5

A method for preparing alumina-based $Al_2O_3/ZrO_2$ $(Y_2O_3)$ composite solid solution ceramic powder by an aluminum-oxygen combustion synthesis and water spraying process is specifically carried out by the following steps:

1. Drying: Dry the aluminum powder, alumina powder, zirconia powder and yttrium oxide powder. The aluminum powder is vacuum dried at a vacuum of 0.06 MPa, the drying temperature is 80° C., and the drying time is 10 h; the alumina powder, the zirconia powder, and the yttrium oxide powder are directly dried, the drying temperature is 80° C., and the drying time is 10 h.

2. Mixing: Mixing 142.89 g of dried aluminum powder, 518.54 g of dried alumina powder, 338.56 g of dried zirconia powder and 18.66 g of dried yttrium oxide. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$ and air, and setting the oxygen pressure at 15 MPa and air pressure at 3 MPa. The nozzle is arranged at the lower end of the high-pressure reactor. The nozzle size of the nozzle is 14 mm. The high-pressure reactor is installed at an upper side of the circulating water-cooling device, the resistance wire ignites the mixture material, and the high-temperature combustion synthesis reaction is carried out. After the high-temperature melt is formed, keep warm for 25 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

The solid solution micron powder is densified by hot pressing and sintering, and the prepared material is subjected to a three-point bending test. Its performance is: fracture toughness is 9.15 MPa·m$^{1/2}$ and bending strength is 910 MPa.

Exemplary Embodiment 6

A method for preparing alumina-based $Al_2O_3/ZrO_2$ $(Y_2O_3)$ composite solid solution ceramic powder by an aluminum-oxygen combustion synthesis and water spraying process is specifically carried out by the following steps:

1. Drying: Dry the aluminum powder, alumina powder, zirconia powder and yttrium oxide powder. The aluminum powder is vacuum dried at a vacuum of 0.06 MPa, the drying temperature is 80° C., and the drying time is 10 h; the alumina powder, the zirconia powder, and the yttrium oxide powder are directly dried, the drying temperature is 80° C., and the drying time is 10 h.

2. Mixing: Mixing 179.48 g of dried aluminum powder, 588.25 g of dried alumina powder, 232.26 g of dried zirconia powder and 34.14 g of dried yttrium oxide. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$ at 18 MPa and $N_2$ at 2 MPa. The nozzle is arranged at the lower end of the high-pressure reactor. The nozzle size of the nozzle is 13 mm. The high-pressure reactor is installed at an upper side of the circulating water-cooling device, the resistance wire ignites the mixture material, and the high-temperature combustion synthesis reaction is carried out. After the high-temperature melt is formed, keep warm for 20 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 7

Referring to FIG. 1, a method for preparing alumina-based $Al_2O_3/ZrO_2(CeO_2)$ composite solid solution ceramic powder by an aluminum-oxygen combustion synthesis and water spraying process is specifically carried out by the following steps:

1. Drying: Dry the aluminum powder, alumina powder, zirconia powder and cerium oxide powder. The aluminum powder is vacuum dried at a vacuum of 0.061 MPa, the drying temperature is 80° C., and the drying time is 10 h; the alumina powder, the zirconia powder and the cerium oxide powder are directly dried, the drying temperature is 80° C., and the drying time is 10 h.

2. Mixing: Mixing 178.62 g of dried aluminum powder, 334.37 g of dried alumina powder, 487.01 g of dried zirconia powder and 204.42 g of dried cerium oxide. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$, and setting the oxygen pressure at 18 MPa. The nozzle is arranged at the lower end of the high-pressure reactor. The nozzle size of the nozzle is 13 mm. The high-pressure reactor is installed at an upper side of the circulating water-cooling device, the resistance wire ignites the mixture material, and the high-temperature combustion synthesis reaction is carried out. After the high-temperature melt is formed, keep warm for 50 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 8

A method for preparing alumina-based $Al_2O_3/ZrO_2$ composite solid solution ceramic powder by an aluminum-oxygen combustion synthesis and water spraying process is specifically carried out by the following steps:

1. Drying: Dry the aluminum powder, alumina powder and zirconia powder. The aluminum powder is vacuum dried at a vacuum of 0.061 MPa, the drying temperature is 80° C., and the drying time is 10 h; the alumina powder and zirconia powder are directly dried, the drying temperature is 80° C., and the drying time is 10 h.

2. Mixing: Mixing 1689.7 g of dried aluminum powder, 3476.2 g of dried alumina powder and 4834.1 g of dried zirconia powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$, mixed gas, which is a mixture of oxygen and nitrogen, wherein the oxygen pressure setting is at 16 MPa and the nitrogen pressure setting is at 2 MPa. The nozzle is arranged at the lower end of the high-pressure reactor. The nozzle size of the nozzle is 14 mm. The high-pressure reactor is installed at an upper side of the circulating water-cooling device, the resistance wire ignites the mixture material, and the high-temperature combustion synthesis reaction is carried out. After the high-temperature melt is formed, keep warm for 55 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 9

A method for preparing alumina-based $Al_2O_3/ZrO_2$ composite solid solution ceramic powder by an aluminum-oxygen combustion synthesis and water spraying process is specifically carried out by the following steps:

1. Drying: Dry the aluminum powder, alumina powder and zirconia powder. The aluminum powder is vacuum dried at a vacuum of 0.06 MPa, the drying temperature is 80° C., and the drying time is 10 h; the alumina powder and zirconia powder are directly dried, the drying temperature is 80° C., and the drying time is 10 h.

2. Mixing: Mixing 1317.3 g of dried aluminum powder, 3984.9 g of dried alumina powder and 4697.8 g of dried zirconia powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, first heating the mixture material to 300° C. and then introducing $O_2$ to the pressure reaction tank, and the oxygen pressure setting is at 15 MPa. The nozzle is arranged at the lower end of the high-pressure reactor. The nozzle size of the nozzle is Φ8 mm. The high-pressure reactor is installed at an upper side of the circulating water-cooling device, the resistance wire ignites the mixture material, and the high-temperature combustion synthesis reaction is carried out. After the high-temperature melt is formed, keep warm for 30 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 10

A method for preparing alumina-based $Al_2O_3/MgO$ composite solid solution ceramic powder by an aluminum-oxygen combustion synthesis and water spraying process is specifically carried out by the following steps:

1. Drying: Dry the aluminum powder, alumina powder and magnesium oxide powder. The aluminum powder is vacuum dried at a vacuum of 0.06 MPa, the drying temperature is 80° C., and the drying time is 10 h; the alumina powder and magnesium oxide powder are directly dried, the drying temperature is 80° C., and the drying time is 10 h.

2. Mixing: Mixing 145.20 g of dried aluminum powder, 425.23 g of dried alumina powder and 429.56 g of dried magnesium oxide powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$ and the oxygen pressure setting is at 15 MPa. The nozzle is arranged at the lower end of the high-pressure reactor. The nozzle size of the nozzle is 14 mm. The high-pressure reactor is installed at an upper side of the circulating water-cooling device, the resistance wire ignites the mixture material, and the high-temperature combustion synthesis reaction is carried out. After the high-temperature melt is formed, keep warm for 35 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 11

A method for preparing alumina-based composite solid solution ceramic powder by an aluminum-oxygen combustion synthesis and water spraying process is specifically carried out by the following steps:

1. Drying: Dry the aluminum powder, alumina powder and titanium oxide powder. The aluminum powder is vacuum dried at a vacuum of 0.061 MPa, the drying temperature is 80° C., and the drying time is 10 h; the alumina powder and titanium oxide powder are directly dried, the drying temperature is 80° C., and the drying time is 10 h.

2. Mixing: Mixing 154.76 g of dried aluminum powder, 428.43 g of dried alumina powder and 416.81 g of dried titanium oxide powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$ and the oxygen pressure setting is at 10 MPa. The nozzle is arranged at the lower end of the high-pressure reactor. The nozzle size of the nozzle is 15 mm. The high-pressure reactor is installed at an upper side of the circulating water-cooling device, the resistance wire ignites the mixture material, and the high-temperature combustion synthesis reaction is carried out. After the high-temperature melt is formed, keep warm for 35 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 12

A method for preparing alumina-based composite solid solution ceramic powder by an aluminum-oxygen combustion synthesis and water spraying process is specifically carried out by the following steps:

1. Drying: Dry the aluminum powder and alumina powder. The aluminum powder is vacuum dried at a vacuum of 0.06 MPa, the drying temperature is 80° C., and the drying time is 12 h; the alumina powder is directly dried, the drying temperature is 80° C., and the drying time is 12 h.

2. Mixing: Mixing 136.18 g of dried aluminum powder and 863.82 g of dried alumina powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing a mixed gas of $O_2$ at 12 MPa and air at 2 MPa. The nozzle is arranged at the lower end of the high-pressure reactor. The nozzle size of the nozzle is 15 mm. The high-pressure reactor is installed at an upper side of the circulating water-cooling device, the resistance wire ignites the mixture material, and the high-temperature combustion synthesis reaction is carried out. After the high-temperature melt is formed, keep warm for 20 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

Exemplary Embodiment 13

A method for preparing alumina-based composite solid solution ceramic powder by an aluminum-oxygen combustion synthesis and water spraying process is specifically carried out by the following steps:

1. Drying: Dry the aluminum powder, alumina powder and zirconia powder. The aluminum powder is vacuum dried at a vacuum of 0.06 MPa, the drying temperature is 80° C., and the drying time is 10 h; the alumina powder and zirconia powder are directly dried, the drying temperature is 80° C., and the drying time is 10 h.

2. Mixing: Mixing 147.4 g of dried aluminum powder, 173.48 g of dried alumina powder and 679.11 g of dried zirconia powder. The planetary ball mill is used for ball milling, the mass ratio of ball to material is 3:1, the ball milling time is 4 h, after ball milling, it is passed through a 40-200 mesh sieve to obtain the mixture material.

3. Loading the mixture material into a high-pressure reactor, introducing $O_2$, and setting the oxygen pressure at 15 MPa. The nozzle is arranged at the lower end of the high-pressure reactor. The nozzle size of the nozzle is 14 mm. The high-pressure reactor is installed at an upper side of the circulating water-cooling device, the resistance wire ignites the mixture material, and the high-temperature combustion synthesis reaction is carried out. After the high-temperature melt is formed, keep warm for 20 s. Then the nozzle is turned on, and the high-temperature melt is ejected through the nozzle under high temperature and high pressure and is sprayed into the water-cooling device for rapid cooling of the liquid phase to obtain alumina-based solid solution ceramic powder. The cooling liquid for rapid cooling of the liquid phase is water.

What is claimed is:

1. A method for preparing alumina-based solid solution ceramic powder by an aluminum-oxygen combustion synthesis and water spraying process, characterized in that, the method is carried out according to the following steps:

drying raw materials and then mixing uniformly to obtain a mixture;

loading the mixture into a high-pressure reactor, starting ignition in an oxygen-containing atmosphere, and carrying out high-temperature combustion synthesis reaction;

maintaining heat preservation for 1 s-60 s after a high-temperature melt is formed;

then turning on a nozzle, spraying out the high-temperature melt through the nozzle to carry out liquid phase rapid cooling so that an alumina-based solid solution ceramic powder is obtained, the raw materials are aluminum powder and diluent, and the mass fraction of the aluminum powder in the mixture is 10%-40%, and the mass fraction of the diluent is 60%-90%.

2. A method for preparing alumina-based solid solution ceramic powder by an aluminum-oxygen combustion synthesis and water spraying process according to claim 1, characterized in that: the diluent is one or more of the group consisting of: aluminum oxide, zirconium oxide, magnesium oxide, calcium oxide, strontium oxide, scandium (III) oxide, iron oxide, molybdenum oxide, barium oxide, vanadium oxide, titanium oxide, chromium oxide, cobalt oxide, nickel oxide, yttrium oxide, niobium oxide, hafnium (IV) oxide, tantalum oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, silicon oxide and lutetium oxide.

3. A method for preparing alumina-based solid solution ceramic powder by an aluminum-oxygen combustion synthesis and water spraying process according to claim 2, characterized in that: when the product of aluminum-oxygen combustion synthesis contains zirconium oxide, a molar ratio of yttrium oxide to zirconium oxide is (0-20):100; a molar ratio of cerium oxide to zirconium oxide is (0-30):100; a molar ratio of magnesium oxide to zirconium oxide is (0-28):100; a molar ratio of calcium oxide to zirconium oxide is (0-33.45):100; a molar ratio of titanium oxide to zirconium oxide is (0-44.41):100; a molar ratio of scandium oxide to zirconium oxide is (0-20):100.

4. A method for preparing alumina-based solid solution ceramic powder by an aluminum-oxygen combustion synthesis and water spraying process according to claim 3, characterized in that: the oxygen-containing atmosphere is an atmosphere of oxygen, oxygen and air mixture, or a mixture of oxygen and nitrogen;

when the oxygen-containing atmosphere is the atmosphere of oxygen, a pressure of oxygen is 5 MPa-50 Mpa;

when the oxygen-containing atmosphere is the atmosphere of oxygen and air mixture, a pressure of oxygen in the oxygen-containing atmosphere is 5 MPa-50 Mpa, a pressure of air is 0 MPa-20 MPa;

when the oxygen-containing atmosphere is the atmosphere of oxygen and nitrogen mixture, a pressure of oxygen in the oxygen-containing atmosphere is 5 MPa-50 Mpa, a pressure of nitrogen is 0 MPa-20 MPa.

5. A method for preparing alumina-based solid solution ceramic powder by an aluminum-oxygen combustion synthesis and water spraying process according to claim 4, characterized in that: loading the mixture into the high-pressure reactor, heating the mixture to 25-300° C. before starting ignition in the oxygen-containing atmosphere for carrying out high-temperature combustion synthesis reaction.

* * * * *